United States Patent
Son et al.

(10) Patent No.: US 11,368,828 B2
(45) Date of Patent: Jun. 21, 2022

(54) METHOD AND DEVICE FOR TRANSMITTING DATA ON BASIS OF CHANGE IN STATE RELATED TO MOVEMENT OF ELECTRONIC DEVICE

(71) Applicant: Samsung Electronics Co., Ltd., Gyeonggi-do (KR)

(72) Inventors: Dong Il Son, Gyeonggi-do (KR); Ga Jin Song, Gyeonggi-do (KR); Sun Min Hwang, Gyeonggi-do (KR)

(73) Assignee: Samsung Electronics Co., LTD, Suwon-si (KR)

( * ) Notice: Subject to any disclaimer, the term of this patent is extended or adjusted under 35 U.S.C. 154(b) by 0 days.

(21) Appl. No.: 16/763,039

(22) PCT Filed: Nov. 6, 2018

(86) PCT No.: PCT/KR2018/013333
§ 371 (c)(1),
(2) Date: May 11, 2020

(87) PCT Pub. No.: WO2019/093730
PCT Pub. Date: May 16, 2019

(65) Prior Publication Data
US 2020/0389774 A1      Dec. 10, 2020

(30) Foreign Application Priority Data

Nov. 13, 2017   (KR) .................. 10-2017-0150609

(51) Int. Cl.
*H04W 4/48*   (2018.01)
*G06F 3/16*   (2006.01)
*H04W 4/02*   (2018.01)

(52) U.S. Cl.
CPC .............. *H04W 4/48* (2018.02); *G06F 3/167* (2013.01); *H04W 4/027* (2013.01)

(58) Field of Classification Search
CPC ....... G09G 5/00; G09G 5/14; H04W 52/0261; H04W 4/20; H04W 76/27; H04W 88/06
See application file for complete search history.

(56) References Cited

U.S. PATENT DOCUMENTS

2006/0244633 A1   11/2006   Bahn
2011/0195758 A1    8/2011   Damale et al.
(Continued)

FOREIGN PATENT DOCUMENTS

JP   2015-32312 A    2/2015
JP   2016-184200 A  10/2016
(Continued)

OTHER PUBLICATIONS

Korean Search Report dated Dec. 20, 2021.
Notice of Patent Grant dated Mar. 2, 2022.

*Primary Examiner* — Iqbal Zaidi
(74) *Attorney, Agent, or Firm* — Cha & Reiter, LLC

(57) ABSTRACT

Various embodiments of the disclosure relate to a method and apparatus for acquiring and providing information related to a state of an electronic device in Wireless Access in Vehicular Environment (WAVE) communication. According to various embodiments, the electronic device may include a communication module, at least one sensor, and a processor. The processor may be configured to identify a state related to a movement of the electronic device by using the at least one sensor, wherein the identifying of the state related to the movement includes transmitting information related to the movement to an external electronic device by using the communication module, and transmit, to the external electronic device, the information related to the movement and information related to the state change by using the communication module if the state related to the movement is changed. Various embodiments are possible.

20 Claims, 12 Drawing Sheets

(56) References Cited

U.S. PATENT DOCUMENTS

| | | |
|---|---|---|
| 2013/0210460 A1 | 8/2013 | Subramanian et al. |
| 2014/0195102 A1 | 7/2014 | Nathanson |
| 2015/0035685 A1 | 2/2015 | Strickland et al. |
| 2015/0091740 A1 | 4/2015 | Bai et al. |
| 2015/0281430 A1* | 10/2015 | Cho .................. H04M 1/72463 |
| | | 455/418 |
| 2015/0319681 A1 | 11/2015 | Nathanson et al. |
| 2016/0055745 A1 | 2/2016 | Karacan et al. |
| 2017/0053530 A1 | 2/2017 | Gogic et al. |
| 2018/0292882 A1* | 10/2018 | Choi ................... G06F 3/04883 |
| 2020/0228901 A1* | 7/2020 | Baek .................... H04R 25/405 |

FOREIGN PATENT DOCUMENTS

| | | |
|---|---|---|
| KR | 10-0781135 B1 | 11/2007 |
| KR | 100781135 B1 | 11/2007 |
| KR | 10-2014-0121854 A | 10/2014 |
| KR | 1020150112152 A | 10/2015 |
| KR | 10-2016-0032963 A | 3/2016 |

* cited by examiner

METHOD AND DEVICE FOR TRANSMITTING DATA ON BASIS OF CHANGE IN STATE RELATED TO MOVEMENT OF ELECTRONIC DEVICE

CLAIM OF PRIORITY

This application is a National Phase Entry of PCT International Application No. PCT/KR2018/013333, which was filed on Nov. 6, 2018 and claims a priority to Korean Patent Application No. 10-2017-0150609, which was filed on Nov. 13, 2017, the contents of which are incorporated herein by reference.

TECHNICAL FIELD

Various embodiments of the disclosure disclose a method and apparatus for acquiring and providing information related to a state of an electronic device in Wireless Access in Vehicular Environment (WAVE) communication.

BACKGROUND ART

Recently, with the development of digital technologies, various types of electronic devices are widely used, such as a mobile communication terminal, a smart phone, a table Personal Computer (PC), a notebook, a Personal Digital Assistant (PDA), a wearable device, a digital camera, a vehicle control device, or the like. A Wireless Access in Vehicular Environment (WAVE) communication technique relates to Vehicle to Everything (V2X) communication which may include, for example, Vehicle to Vehicle (V2V) wireless communication, Vehicle to Infrastructure (V2I) wireless communication, In-Vehicle Networking (IVN), Vehicle to Pedestrian (V2P) wireless communication, or the like. Recently, the WAVE communication (or V2X communication) technique may be used to develop and use services for improving an information environment, stability, convenience, or the like of vehicles and roads.

DISCLOSURE OF INVENTION

Technical Problem

In Wireless Access in Vehicular Environment (WAVE) communication, when there is no additional configuration for a moving situation of an electronic device (or a user of the electronic device), only simple information related to a basic moving situation is transmitted to the outside. Conventionally, therefore, when it is necessary to transfer detailed information on the moving situation of the electronic device to the outside, inconveniently, a user has to directly input and pre-configure the related information by manipulating the electronic device. If the detailed information is not input in advance, user's safety may be threatened in a situation in which the user moves. In addition, such an inconvenience leads to a poor applicability and usability of a service provided for the user's safety.

Various embodiments disclose a method and apparatus capable of accurately transferring information related to a state of an electronic device in accordance with a moving situation by identifying a situation in which default information is transmitted and a situation in which additional information has to be transmitted, when the electronic device performs WAVE communication.

Various embodiments disclose a method and apparatus for monitoring a situation in which additional information has to be transmitted in WAVE communication of an electronic device, and upon occurrence of a situation for the additional information, providing a feedback for the situation to a user, so that a user's input is possible for the additional information in a simpler, faster, and safer manner.

Solution to Problem

An electronic device according to various embodiments of the disclosure may include a communication module, at least one sensor, and a processor. The processor may be configured to identify a state related to a movement of the electronic device by using the at least one sensor, wherein the identifying of the state related to the movement includes transmitting information related to the movement to an external electronic device by using the communication module, and transmit, to the external electronic device, the information related to the movement and information related to the state change by using the communication module if the state related to the movement is changed.

A method of operating an electronic device according to various embodiments of the disclosure may include identifying a state related to a movement of the electronic device by using at least one sensor, and if the state related to the movement is changed, transmitting information related to the movement and information related to the state change to an external electronic device by using the communication module. The identifying of the state related to the movement may include transmitting the information related to the movement to the external electronic device by using the communication module.

In order to solve the aforementioned problem, various embodiments of the disclosure may include a computer readable recording medium recording a program for executing the method in the processor.

Advantageous Effects of Invention

An electronic device and operating method thereof according to various embodiments may provide a user with a guide and request for additional information in accordance with a user situation, based on detecting a change in a state related to a movement of the electronic device. According to various embodiments, the electronic device may monitor a state related to the movement, may provide additional information, based on a monitoring result on a real-time basis, and may allow a simple and accurate user input. Accordingly, quality of a service based on Wireless Access in Vehicular Environment (WAVE) communication may be increased, and a higher quality service may be provided for user's safety.

BEST MODE FOR CARRYING OUT THE INVENTION

Figure 1:
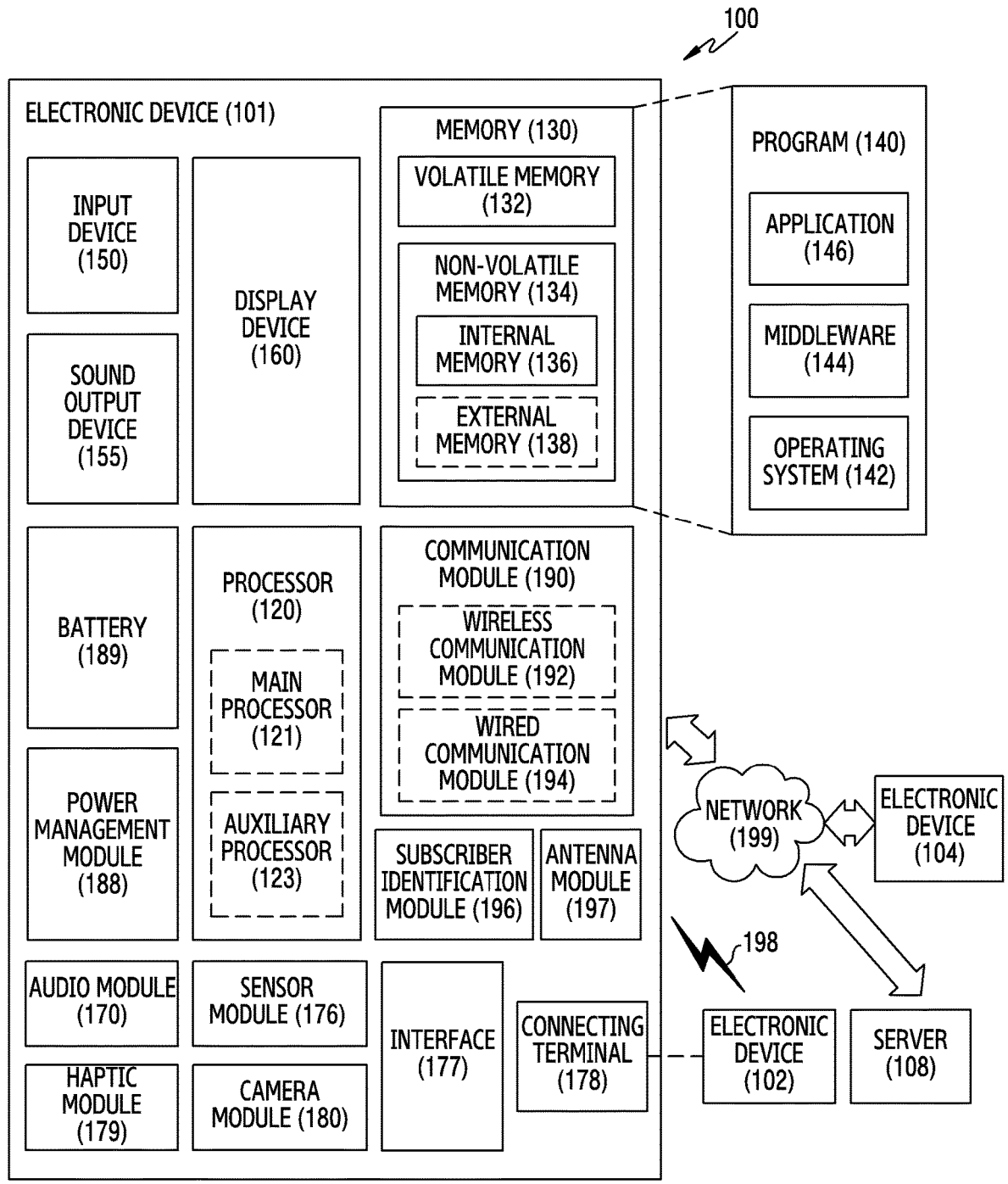
FIG. 1 is a block diagram of an electronic device in a network environment according to various embodiments.

Hereinafter, various embodiments of the disclosure are described with reference to the accompanying drawings. However, it should be appreciated that this is not intended to limit the technological features set forth herein to particular embodiments and include various changes, equivalents, or replacements for an embodiment of the disclosure. With regard to the description of the drawings, similar reference numerals may be used to refer to similar or related elements. In addition, an embodiment disclosed in the disclosure is presented for explanation and understanding of the disclosed technique, and is not intended to limit the scope of the technique. Therefore, all changes made without departing from the technical concept of the disclosure or various other embodiments will be construed as being included in the scope of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (MST)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
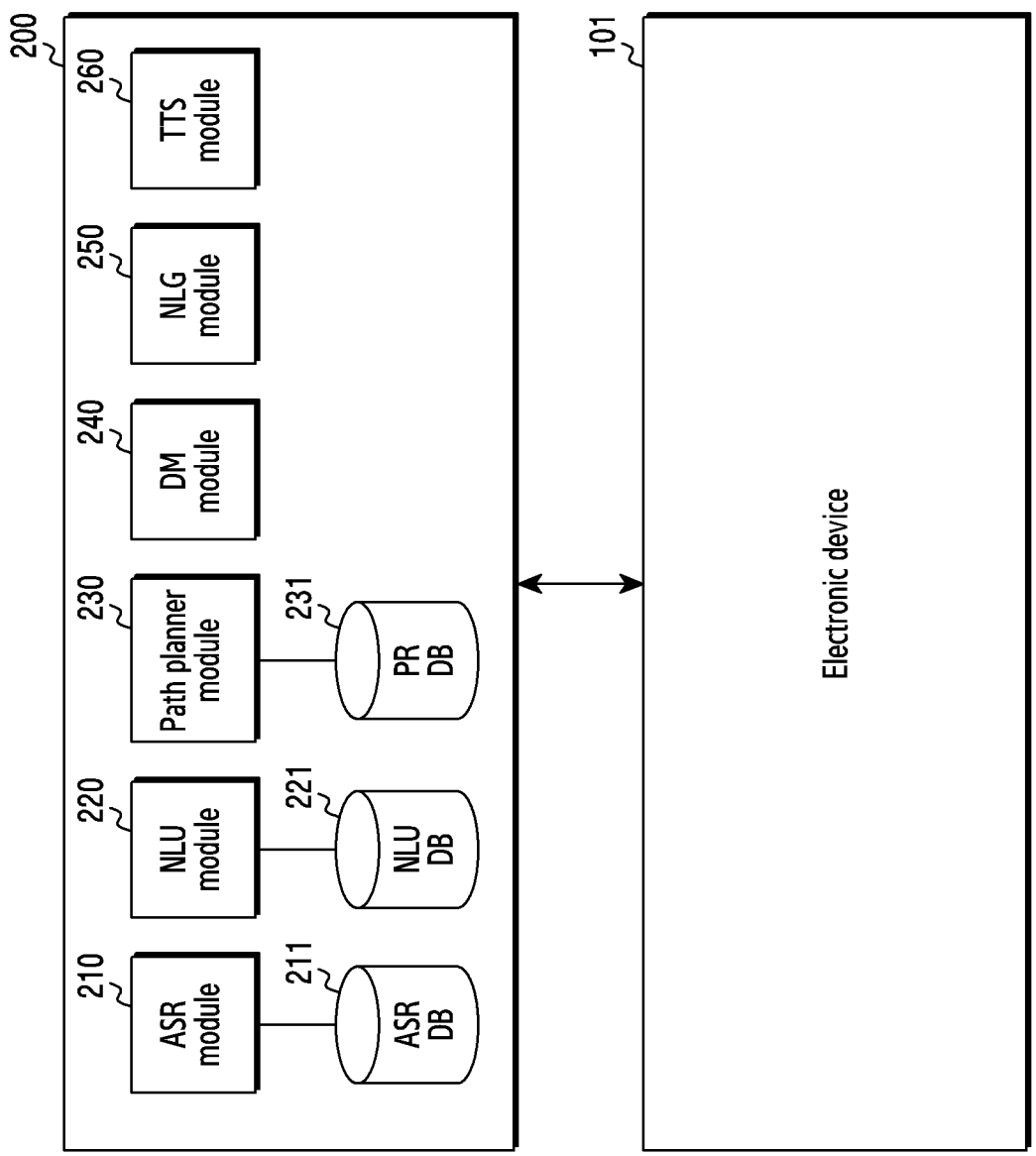
FIG. 2 is a block diagram illustrating an intelligence server of an integrated intelligence system according to various embodiments.

FIG. 2 is a block diagram illustrating an intelligence server of an integrated intelligence system according to various embodiments.

In various embodiments, the integrated intelligence system may include, for example, the electronic device 101 (e.g., a user terminal) and an intelligence server 200 (e.g., the server 108 of FIG. 1). In various embodiments, although not shown, the integrated intelligence system may further include a personalization information server (not shown) or a suggestion server 400.

According to an embodiment, the intelligence server 200 may receive a voice input of a user from the electronic device 101 through a communication network and may change the voice input to text data. The intelligence server 200 may generate (or select) a path rule, based on the text data. The path rule may include information on an action (or an operation) for performing a function of an application (or an app) or information on a parameter required to execute the action. In addition, the path rule may include the order of the action of the application. The electronic device 101 may receive the path rule from the intelligence server 200, select an application related to the received path rule, and execute an action included in the path rule in the selected application.

In general, the term "path rule" in the disclosure may refer to a sequence of states in which the electronic device 101 performs a task requested by a user, but is not limited thereto. In other words, the path rule may include information on the sequence of the states. For example, the task may be a certain action that can be provided by an intelligence application. The task may include generating a schedule, transmitting a picture to the desired other party, or providing weather information. The electronic device 101 may perform the task by sequentially having at least one state (e.g., an operating state of the electronic device 101).

According to various embodiments, the path rule may be provided, or generated, by an Artificial Intelligent (AI) system. The AI system may be a rule-based system, or may be a neural network-based system (e.g., a Feedforward Neural Network (FNN), a Recurrent Neural Network (RNN), etc.). Alternatively, the AI system may be a combination of the aforementioned systems or another AI system. According to an embodiment, the path rule may be selected from a set of predefined path rules, or may be generated on a real-time basis in response to a user request. For example, the AI system may select at least one path rule among the plurality of predetermined path rules, or may generate a path rule dynamically (or on a real-time basis). In addition, the electronic device 101 may use a hybrid system to provide the path rule.

According to an embodiment, the electronic device 101 may execute the aforementioned action, and may display a screen corresponding to a state of the electronic device 101, which has executed the action, in the display device 160 (e.g., a display). For another example, the electronic device 101 may execute the aforementioned action, and may not display a result obtained by executing the action in the display device 160. For example, the electronic device 101 may execute a plurality of actions, and may display only some of results, which are obtained by executing the plurality of actions, in the display device 160. For example, the electronic device 101 may display only a result, which is obtained by executing a last action, in the display device 160. For another example, the electronic device 101 may receive a user input to display a result, which is obtained by executing the action, in the display device 160.

According to an embodiment, the user information server may include a database in which user information is stored. For example, the subscriber information server may receive the user information (e.g., context information, application execution information, etc.) from the electronic device 101 and store the user information in the database. The intelligence server 200 may receive the user information from the subscriber information server through a communication network and use the user information when a path rule for a user input is generated. According to an embodiment, the electronic device 101 may receive the user information from the subscriber information server through the communication network and use the user information as information for managing the database.

According to an embodiment, the suggestion server may include a database storing information on a function in a terminal or an application's function to be introduced (or provided). For example, the suggestion server may include a database for a function that can be used by the user by receiving the user information of the electronic device 101 from the suggestion server. The electronic device 101 may receive information on a function to be provided from the suggestion server through the communication network and provide the information to the user.

Referring to FIG. 2, an intelligence server 200 may include an Automatic Speech Recognition (ASR) module 210, a Natural Language Understanding (NLU) module 220, a path planner module 230, a Dialogue Manager (DM) module 240, a Natural Language Generator (NLG) module 250, a Text To Speech (TTS) module 260, or the like. According to an embodiment, the intelligence server 200 may include a communication circuit, a memory, and a processor. The processor may execute an instruction stored in the memory to drive the ASR module 210, the NLU module 220, the path planner module 230, the DM module 240, the NLG module 250, and the TTS module 260. The intelligence server 200 may transmit or receive data (or information) to or from an external electronic device (e.g., the electronic device 101) through the communication circuit.

The NLU module 200 or path planner module 230 of the intelligence server 200 may generate a Path Rule (PR).

According to an embodiment, the ASR module 210 may convert a user input (e.g., a voice) received from the electronic device 101 into text data. For example, the ASR module 210 may include an utterance recognition module. The utterance recognition module may include an acoustic model and a language model. For example, the acoustic model may include information related to phonation, and the language model may include unit phoneme information and information on a combination of the unit phoneme information. The utterance recognition module may convert user phonation into text data by using the information on phonation and the information on the unit phoneme information. For example, information on the acoustic model and language model may be stored in an ASR database 211.

According to an embodiment, the NLU module 220 may grasp a user intent by performing syntactic analysis or semantic analysis. The syntactic analysis may divide a user input into syntactic units (e.g., words, phrases, morphemes, etc.) and determine which syntactic elements the divided units have. The semantic analysis may be performed by using semantic matching, rule matching, formula matching, or the like. Accordingly, the NLU module 220 may acquire a domain, intent, or a parameter (or a slot) required for the user input to express the intent.

According to an embodiment, the NLU module 220 may determine the user's intent and the parameter by using a matching rule which is divided into a domain, intent, and a parameter (or a slot) required to grasp the intent. For example, one domain (e.g., an alarm) may include a plurality of intents (e.g., alarm settings, alarm cancellation, etc.), and one intent may include a plurality of parameters (e.g., a time, the number of iterations, an alarm sound, etc.). For example, the plurality of rules may include one or more essential parameters. The matching rule may be stored in a NLU DataBase (DB) 221.

According to an embodiment, the NLU module 220 may grasp the meaning of words extracted from a user input by using linguistic features (e.g., syntactic elements) such as morphemes, phrases, or the like and may match the meaning of the grasped words to the domain and intent to determine the user intent. For example, the NLU module 220 may calculate how many words extracted from the user input are included in each of the domain and the intent to determine the user intent. According to an embodiment, the NLU module 220 may determine a parameter of the user input by using words used as a basis for grasping the intent. According to an embodiment, the NLU module 220 may determine the user intent by using the NLU DB 221 storing the linguistic features for grasping the intent of the user input. According to another embodiment, the NLU module 220 may determine the user intent by using a Personal Language Model (PLM). For example, the NLU module 220 may determine the user intent by using the personalized information (e.g., a contact list or a music list). For example, the PLM may be stored in the NLU DB 221. According to an embodiment, not only the NLU module 220 but also the ASR module 210 may recognize a user's voice with reference to the PLM stored in the NLU DB 221.

According to an embodiment, the NLU module 220 may generate a path rule, based on the intent of the user input and the parameter. For example, the NLU module 220 may select an application to be executed and may determine an action to be executed in the selected application, based on the intent of the user input. The NLU module 220 may determine the parameter corresponding to the determined action to generate the path rule. According to an embodiment, the path rule generated by the NLU module 220 may include information on the application to be executed, the action (e.g., at least one or more states) to be executed in the application, and a parameter required to execute the action.

According to an embodiment, the NLU module 220 may generate one path rule or a plurality of path rules, based on the intent of the user input and the parameter. For example, the NLU module 220 may receive a path rule set corresponding to the electronic device 101 from the path planner module 230 and may map the intent of the user input and the parameter to the received path rule set to determine the path rule.

According to another embodiment, the NLU module 220 may determine the application to be executed, the action to be executed in the application, and a parameter required to execute the action, based on the intent of the user input and the parameter, to generate one path rule or a plurality of path rules. For example, by using information of the electronic device 101, the NLU module 220 may arrange the application to be executed and the action to be executed in the application according to the intent of the user input in the form of ontology or a graph model to generate the path rule. For example, the generated path rule may be stored in a Path Rule (PR) DB 231 through the path planner module 230. The generated path rule may be added to a path rule set of the PR DB 231.

According to an embodiment, the NLU module 220 may select at least one path rule among the generated plurality of path rules. For example, the NLU module 220 may select an optimal path rule among the plurality of path rules. For another example, in a case where only some of actions are specified based on a user utterance, the NLU module 220 may select a plurality of path rules. The NLU module 220 may determine one path rule among the plurality of path rules according to an additional input of the user.

According to an embodiment, the NLU module 220 may transmit the path rule to the electronic device 101 at the request for the user input. For example, the NLU module 220 may transmit one path rule corresponding to the user input to the electronic device 101. For another example, the NLU module 220 may transmit the plurality of path rules corresponding to the user input to the electronic device 101. For example, in a case where some actions are specified based on the user utterance, the plurality of path rules may be generated by the NLU module 220.

According to an embodiment, the path planner module 230 may select at least one path rule among the plurality of path rules.

According to an embodiment, the path planner module 230 may transfer a path rule set including the plurality of path rules to the NLU module 220. The plurality of path rules of the path rule set may be stored in the PR DB 231 coupled to the path planner module 230 in a table form. For example, the path planner module 230 may transfer a path rule set corresponding to information (e.g., OS information or application information) of the electronic device 101, which is received from the electronic device 101 (e.g., an intelligence agent of the electronic device), to the NLU module 220. For example, a table stored in the PR DB 231 may be stored for each domain or for each version of the domain.

According to an embodiment, the path planner module 230 may select one path rule or the plurality of path rules from the path rule set to transfer the selected path rule(s) to the NLU module 220. For example, the path planner module 230 may match the user intent and the parameter to the path rule set corresponding to the electronic device 101 to select the one path rule or the plurality of path rules and may transfer the selected path rule(s) to the NLU module 220.

According to an embodiment, the path planner module 230 may generate the one path rule or the plurality of path rules by using the user intent and the parameter. For example, the path planner module 230 may determine the application to be executed and the action to be executed in the application, based on the user intent and the parameter, to generate the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect a kind, version, type, or characteristic of a device performing each path rule.

According to an embodiment, the DM module 240 may determine whether the user intent grasped by the NLU module 220 is clear. For example, the DM module 240 may determine whether the user intent is clear, based on whether information of a parameter is sufficient. The DM module 240 may determine whether the parameter grasped by the NLU module 220 is sufficient to perform a task. According to an embodiment, in a case where the user intent is not clear, the DM module 240 may perform a feedback for requesting the user to provide necessary information. For example, the DM module 240 may perform a feedback for requesting for information on a parameter for grasping the user intent.

According to an embodiment, the DM module 240 may include a content provider module. In a case where the content provider module can perform an action, based on the intent and the parameter grasped by the NLU module 220, the content provider module may generate a result obtained by performing a task corresponding to the user input. According to an embodiment, the DM module 240 may transmit a result generated by the content provider module to the electronic device 101 as a response to the user input.

According to an embodiment, the NLG module 250 may change specified information to a text form. Information changed to the text form may have a form of a natural language utterance.

For example, the specified information may be information on an additional input, information for guiding the completion of an action corresponding to the user input, or information for guiding the additional input of the user (e.g., feedback information on the user input). The information changed to the text form may be transmitted to the electronic device 101 so as to be displayed in the display device 160 of the electronic device 101, or may be transmitted to the TTS module 260 so as to be changed to a voice form.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the electronic device 101. The electronic device 101 may output the information of the voice form to the sound output device 155 (e.g., a speaker).

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. Accordingly, the generated response may be transmitted to the electronic device 101.

According to various embodiments of the disclosure, in order to generate a safety-related message (or safety-related data) (e.g., a Personal Safety Message (PSM)) and broadcast it to a nearby external electronic device (e.g., the electronic device 102 or the electronic device 104), the electronic device 101 (e.g., an application (e.g., V2X safety application) of the electronic device 101) may generate a message by using data received from the external electronic device or a sensor (e.g., the sensor module 176) in the electronic device 101. When an optional parameter is empty while the message is generated, the electronic device 101 (or the application) may transfer data related to an intelligence client (not shown) of the electronic device 101 to fill the optional parameter. For example, the application may transmit data including an application name, a rule id, a parameter type, a parameter name, or the like to the intelligence client to output a proper query to the user.

The intelligence client of the electronic device 101 may transmit to the intelligence server 200 the data (or information) received from the application. The intelligence server 200 may select a query to be inquired to the user, based on data (or information) received through a Natural Language Generator (NLG) module 250. According to an embodiment, if there is no information on a "boarding means" (e.g., MotorizedPropelledType) among the optional parameters, the NLG module 250 may select a query "which transportation means are you on board?". The intelligence server 200 may provide information such as an application name, a rule id, a parameter type (e.g., MotorizedPropelledType), a parameter name (e.g., a boarding means), or the like, so that the selected query can be provided to the user.

According to an embodiment, the NLG module 250 may select a proper utterance to inquire the user, at least based on the received application name, rule id, parameter type, parameter name, or the like. The utterance (e.g., which transportation means are you on board?) selected through the NLG module 250 may be output to the user through the sound output device 155 of the electronic device 101 via a Text-To-Speech (TTS) module 260.

Thereafter, for example, if the user utters "motorcycle", user's utterance data (or audio data) may be transmitted to the intelligence server 200. The intelligence server 200 may convert the data to a text through an Automatic Speech Recognition (ASR) module 210. According to an embodiment, the intelligence server 200 may transmit the converted text data to the electronic device 101 (e.g., the intelligence client). According to another embodiment, the intelligence server 200 may change actions to be executed in the electronic device 101 through a Natural Language Understanding (NLU) module 220, a path planner module 230, or the like, and thereafter may transmit it to the electronic device 101 (e.g., the intelligence client). The electronic device 101 (e.g., the intelligence client) may transfer to an application (e.g., a V2X safety application) the data received from the intelligence server 200 and may broadcast a message (or data) to a nearby external electronic device (e.g., the electronic device 102 or the electronic device 104) by filling optional parameter information.

The electronic device according to various embodiments may be one of various types of electronic devices. The electronic devices may include, for example, a portable communication device (e.g., a smart phone), a computer device, a notebook, a PDA, a portable multimedia device, a portable medical device. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
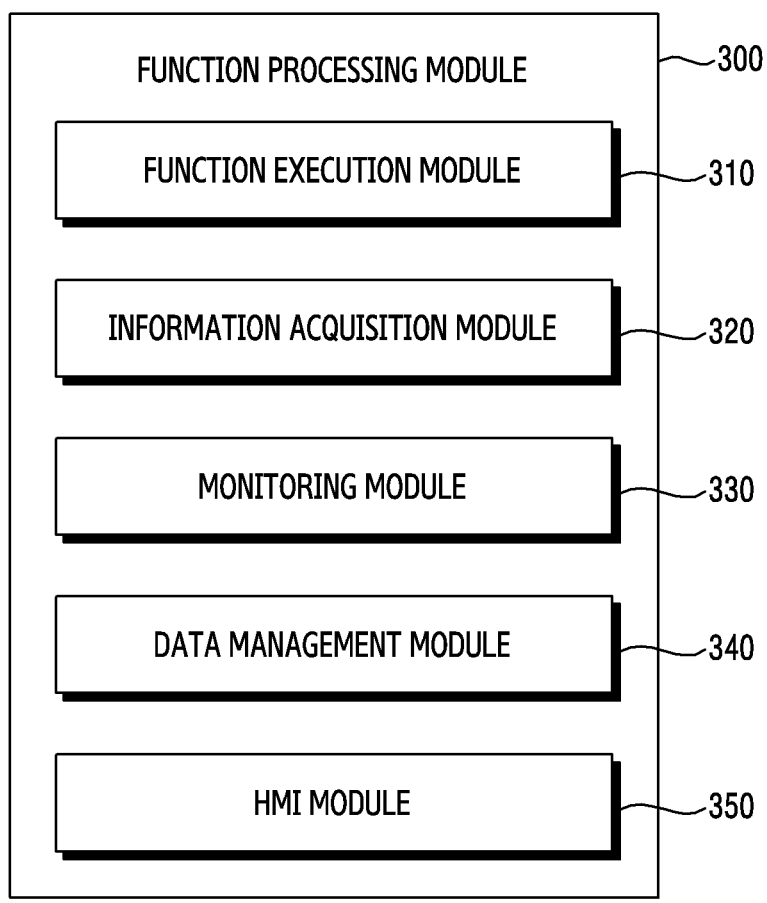
FIG. 3 illustrates an example of a function processing module in an electronic device according to various embodiments.

FIG. 3 illustrates an example of a function processing module in an electronic device according to various embodiments.

Referring to FIG. 3, FIG. 3 may show an example of a function processing module 300 of the electronic device 101 for performing a function related to Wireless Access in Vehicular Environment (WAVE) communication according to various embodiments. For example, FIG. 3 may show an example of the function processing module 300 related to an operation in which the electronic device 101 generates information related to a movement of the electronic device 101 and provides it to a nearby external electronic device (e.g., the electronic device 102 or the electronic device 104). In various embodiments, the function processing module 300 may be included as a processor (e.g., the processor 120 of FIG. 1) including a processing circuitry or may be included as a software module.

Referring to FIG. 3, the function processing module 300 may include a function execution module 310, an information acquisition module 320, a monitoring module 330, a data management module 340, a Human Machine Interface (HMI) module 350, or the like.

The function execution module 310 may execute an application (e.g., a V2X safety application) for WAVE communication related to generating and broadcasting of a safety-related message (e.g., a Personal Safety Message (PSM)). The function execution module 310 may operate in background as an application. The function execution module 310 may execute the application, at least based on a function execution request of the user or a pre-configured condition (e.g., a situation of detecting a user's movement, a situation of entering a road, or the like). According to an embodiment, V2X may collectively refer to Vehicle to Vehicle (V2X) wireless communication, Vehicle to Infrastructure (V2I) wireless communication, In-Vehicle Networking (IVN), Vehicle to Pedestrian (V2P), or the like.

The information acquisition module 320 may use at least the sensor module 176 or wireless communication module 192 of the electronic device 101 to acquire information related to a movement of the electronic device 101. According to an embodiment, the information acquisition module 320 may acquire the information related to the movement of the electronic device 101 by using sensor information acquired from the sensor module 176 (e.g., an acceleration sensor, a gyro sensor, etc.). According to an embodiment, the information acquisition module 320 may acquire the information related to the movement of the electronic device 101 by using a variety of information related to a location acquired from the communication module 190 (e.g., a location measurement circuit (e.g., a GSNN module, a GPS module, etc.), a WiFi module, etc.). According to an embodiment, the information acquisition module 320 may acquire the information related to the movement of the electronic device 101 by using sensor information and location information acquired from the sensor module 176 and the communication module 190. According to an embodiment, the information acquisition module 320 may acquire information related to a movement of an external electronic device from data which is broadcast by a nearby external electronic device (e.g., the electronic device 102 or the electronic device 104) and received from the electronic device 101.

The monitoring module 330 may monitor a state or state change of the electronic device 101, based on the movement-related information acquired from the information acquisition module 320. According to an embodiment, the monitoring module 330 may monitor various situations of the user, such as a change in a moving speed of the electronic device 101, a vibration (or shaking) level of the electronic device 101, whether the external electronic device is accompanied, whether a user is on board a vehicle, or the like. According to an embodiment, the monitoring module 330 may monitor the situation by using a context awareness technique.

The data management module 340 may process an operation of configuring and transmitting data, based on the movement-related information and the monitoring result. According to an embodiment, when only default information is present (or required) based on the monitoring result, the data management module 340 may configure a data packet (e.g., including default data) of a PSM as information corresponding to the default information out of the movement-related information. According to an embodiment, when additional information is present (or required) based on the monitoring result, the data management module 340 may configure a data packet (e.g., including default data and optional data) of a PSM by including information corresponding to the additional information (e.g., information corresponding to a state change) out of the movement-related information.

According to an embodiment, the data management module 340 may further include an operation of determining a user's situation (or state), at least based on the movement-related information (e.g., a variety of sensor information, location information, etc.) of the electronic device 101. According to an embodiment, the data management module 340 may determine a data configuration based on default information and a data configuration including additional information, in accordance with the determined user situation (or state). According to an embodiment, the data management module 340 may generate an object (e.g., a query) to be requested to the user, in accordance with the determined user situation (or state). According to an embodiment, the data management module 340 may process an operation related to acquiring additional information by allowing an interaction with the user on the basis of a voice assistant or an interaction with the user on the basis of a display, in accordance with the determined user situation (or state).

The HMI module 350 may include a module for processing a user input by requesting for and receiving the user input. According to an embodiment, the HMI module 350 may provide a series of interfaces (e.g., voice assistants) which request for a user input (e.g., a voice output of a query) through an audio output (e.g., a voice signal output) corresponding to a user situation and receive the user input on the basis of a user's utterance. In various embodiments, the voice assistant may be used, for example, as a term including hardware (e.g., a voice input module (e.g., a microphone), a speaker, a voice recognition processing module, etc.) and/or software (e.g., an AI, an application, a voice recognition algorithm, etc.) for recognizing a user's voice to perform or control a related operation in accordance with a user's command. According to an embodiment, the HMI module 350 may provide a series of interfaces which request for a user input (e.g., a text output or a query) and receive the user input on the basis of a user's selection (or touch), through a visual output (e.g., an output of a pop-up window including a text related to a query (or a guide)) corresponding to the user situation.

Figure 4:
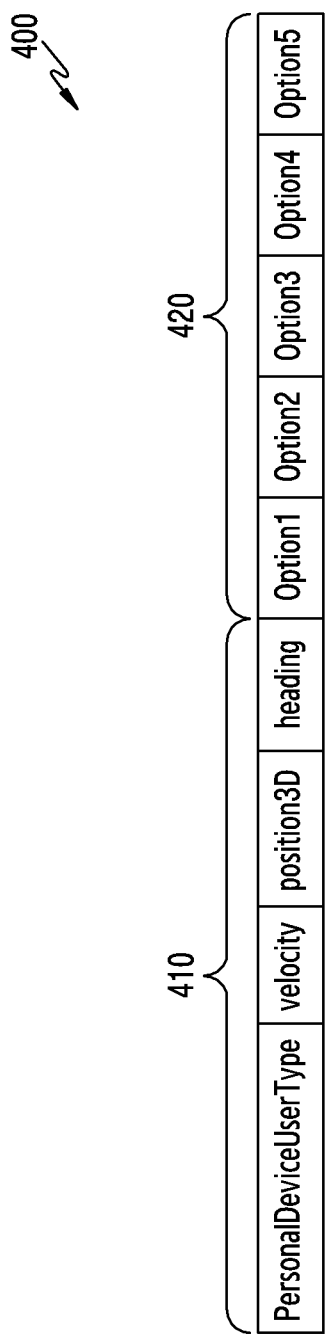
FIG. 4 illustrates an example of a data packet provided in an electronic device according to various embodiments.

FIG. 4 illustrates an example of a data packet provided in an electronic device according to various embodiments.

Referring to FIG. 4, FIG. 4 may show an example of a data packet 400 of a message (e.g., a PSM) used in WAVE communication between devices. As shown in FIG. 4, the data packet 400 may be roughly classified into default data 410 and optional data 420. In an embodiment, the data packet 400 of the PSM may be broadcast by being constructed of only the default data 410 related to a movement of the electronic device 101. In an embodiment, the data packet 400 of the PSM may be broadcast in such a manner that the optional data 420 is additionally configured in the default data 410 depending on at least one piece of optional information based on a state depending on a user's moving situation.

According to an embodiment, the data packet 400 transmitted (or broadcast) by the electronic device 101 may include only the default data 410. For example, the electronic device 101 may be provided with safety by transmitting a current state of the electronic device 101 to the surroundings even if only the default data 410 is present.

According to an embodiment, the data packet 400 transmitted (or broadcast) by the electronic device 101 may include at least part of the optional data 420 together with the default data 410. For example, a situation of the electronic device 101 may vary on a real-time basis, and the electronic device 101 may monitor a current situation. The electronic device 101 may transmit information suitable (or appropriate) for a situation of a change (e.g., a change in a state related to a situation where the electronic device 101 moves) by carrying additional information (e.g., optional information) to the data packet 400 of a message, thereby more accurately transferring a situation of the electronic device 101 (or a user of the electronic device 101) to the surroundings.

According to an embodiment, the electronic device 101 may update the data packet 400 (e.g., the default data 410) in accordance with a pre-defined algorithm for a user's situation. However, since this case may not match to a user's actual situation, in various embodiments, an update suitable for a current situation change may be requested to the user by using a voice agent of the electronic device 101. The electronic device 101 may acquire input parameters from the user in accordance with the current situation change, and may store the acquired parameters by converting the parameters into essential data fields (e.g., optional data fields). According to an embodiment, the voice agent of the electronic device 101 may further include information on the user of the electronic device 101 to further determine whether a voice through a voice interaction is a voice of the user of the electronic device 101, and if it is identified as the user's voice, may update a WAVE parameter.

Table 1 and Table 2 below may show examples of the default data 410 and optional data 420 of the data packet 400 that can be used in various embodiments.

TABLE 1

| Section | Type |
|---|---|
| basicType | PersonalDeviceUserType |
| secMark | DSecond |
| msgCnt | MsgCount |
| id | TemporaryID |
| position | Position3D |
| accuracy | PositionalAccuracy |
| Speed | Velocity |
| heading | Heading |
| . . . | . . . |

As exemplified in FIG. 4 and Table 1, a data format of the default data 410 may indicate an essential parameter of a PSM defined in the WAVE standard. According to an embodiment, basicType may indicate information on whether the electronic device 101 is a device of a pedestrian, a device which is on board a bicycle, a device mounted on a vehicle, a road worker, an animal, or the like. In general, basicType may have a pedestrian type (e.g., PersonalDeviceUserType) by default, and may be changed when a pedestrian is on board a vehicle such as a bicycle. Other information may include information on a movement of the electronic device 101 by extracting it on the basis of a sensor value.

TABLE 2

| Section | Type |
| --- | --- |
| accelSet | Accelerationset4Way |
| pathHistory | PathHistory |
| pathPrediction | PathPrediction |
| propulsion | PropelledInformation |
| useState | PersonalDeviceUsageState |
| crossRequest | PersonalCrossingRequest |
| crossState | PersonalCrossingInProgress |
| clusterSize | NumberOfParticipantsInCluster |
| clusterRadius | PersonalClusterRadius |
| eventresponderType | PublicSafetyEventResponderWorkerType |
| activityType | PublicSafetyAndRoadWorkerActivity |
| activitySubType | PublicSafetyDirectingTrafficSubtype |
| assistType | PersonalAssistive |
| sizing | UserSizeAndBehaviour |
| attachment | Attachment |
| attachmentRadius | AttachmentRadius |
| animalType | AnimalType |
| . . . | . . . |

As exemplified in FIG. 4 and Table 2, the optional data 420 may include at least one piece of optional information out of pedestrian information based on the WAVE standard, and Table 2 may show examples that can be included as optional information.

According to an embodiment, in Table 2, "PropelledInformation" of "propulsion" may indicate information related to whether a moving situation is driven by human power, animal power, or a motor. For example, out of user default information of the default data 410 shown in Table 1, if basicType is selected as a pedestrian, the electronic device 101 may be configured as information indicating that a type of "propulsion" is driven by human power. According to an embodiment, in case of "attachment", information on assist devices that can be moved together with the user may be included. For example, when devices such as a stroller, a cart, a wheelchair, or the like are included in the pedestrian, corresponding information may be transmitted together.

As described above, the electronic device 101 according to various embodiments may include a communication module (e.g., the wireless communication module 192), at least one sensor (e.g., the sensor module 176), and the processor 120. The processor 120 may be configured to identify a state related to a movement of the electronic device by using the at least one sensor, wherein the identifying of the state related to the movement includes transmitting information related to the movement to an external electronic device (e.g., the electronic device 102 or the electronic device 104) by using the communication module, and transmit, to the external electronic device, the information related to the movement and information related to the state change by using the communication module if the state related to the movement is changed.

According to various embodiments, the electronic device 101 may further include a voice input module (e.g., the input device 150). The processor 120 may be configured to acquire a voice of a user of the electronic device through the voice input module, and generate the information related to the state change, at least based on the voice.

According to various embodiments, the processor 120 may be configured to display a user interface for an input of the information related to the state change through a display operatively coupled with the electronic device, and generate the information related to the state change, at least based on an input corresponding to the user interface.

According to various embodiments, the processor 120 may be configured to request for an input of the information related to the state change, if the state related to the movement is changed, and acquire the information related to the state change from the user, based on an interaction with the user.

According to various embodiments, the processor 120 may be configured to identify a level of the state, based on a configured condition, if the state related to the movement is changed, acquire the information related to the state change, at least based on the user's voice, if the state corresponds to a first condition, and acquire the information related to the state change, at least based on an input corresponding to the user interface, if the state corresponds to a second condition.

According to various embodiments, the processor 120 may be configured to identify the state related to the movement, at least based on a change in a moving speed, a vibration level of the electronic device, information related to a movement of the external electronic device, or whether the user is on board a vehicle.

According to various embodiments, the processor 120 may be configured to determine a moving speed of the electronic device, in response to detecting of a trigger related to the state change, and acquire the user's voice for the input of the information related to the state change, through the voice input module if the moving speed is greater than or equal to a reference speed.

According to various embodiments, the processor 120 may be configured to receive, through the communication module, information transmitted by the external electronic device and related to a movement of the external electronic device, the information related to the movement, and information related to a state change of the external electronic device.

According to various embodiments, the processor 120 may be configured to identify first moving information related to the movement of the electronic device and second moving information related to a movement of the external electronic device, and determine whether to stop transmission of the information related to the movement of the electronic device, based on the first moving information and the second moving information.

According to various embodiments, the processor 120 may be configured to identify first moving information related to the movement of the electronic device and second moving information related to a movement of the external electronic device, and generate information related to accompanying of the electronic device and the external electronic device, at least as part of the information related to the state change based on the first moving information and second moving information.

Hereinafter, an operating method will be described according to various embodiments of the disclosure with reference to the accompanying drawings. However, since the various embodiments of the disclosure are not restricted or limited by the content described below, it should be noted that the disclosure is applicable to the various embodiments on the basis of embodiments described below. A hardware-based approach is described for example in the various embodiments of the disclosure described hereinafter. However, since the various embodiments of the disclosure include a technique in which hardware and software are both used, a software-based approach is not excluded in the embodiments of the disclosure.

Figure 5:
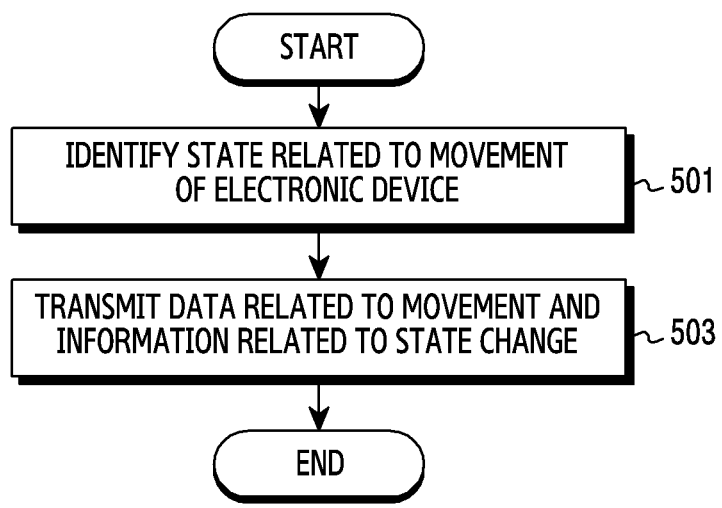
FIG. 5 is a flowchart illustrating a method of operating an electronic device according to various embodiments.

FIG. 5 is a flowchart illustrating a method of operating an electronic device according to various embodiments.

Referring to FIG. 5, in operation 501, the processor 120 (e.g., at least one processor including a processing circuit) (or the function processing module 300 of FIG. 3) of the electronic device 101 may identify a state related to a movement of the electronic device 101. According to an embodiment, the processor 120 may determine the state related to the movement of the electronic device 101 by using sensor information acquired from the sensor module 176 (e.g., an acceleration sensor, a gyro sensor, etc.). According to an embodiment, the processor 120 may determine the state related to the movement of the electronic device 101 by using a variety of information related to a location acquired from the communication module 190 (e.g., a location measurement circuit (e.g., a GSNN module, a GPS module, etc.), a WiFi module, etc.). For example, in a situation in which GPS information is not acquired, such as a case where the electronic device 101 is located (present) indoor, WiFi Positioning System (WPS) information (e.g., Access Point (AP) information received through WiFi) is acquired based on a WiFi module, and movement (or moving) information of the electronic device 101 may be determined through the WPS information. According to an embodiment, the processor 120 may determine the state related to the movement of the electronic device 101 by using sensor information and location information acquired from the sensor module 176 and the communication module 190. According to an embodiment, the processor 120 may transmit movement-related information to an external electronic device (e.g., the electronic device 102 or the electronic device 104) by using the communication module 190 (e.g., the wireless communication module 192) in response to identifying of the state related to the movement.

In operation 503, the processor 120 may transmit the information related to the movement and information related to a state change to the external electronic device (e.g., the electronic device 102 or the electronic device 104). According to an embodiment, the processor 120 may determine whether the state related to the movement of the electronic device 101 is changed, in response to identifying of the state related to the movement. The processor 120 may transmit the information related to the movement and the information related to the state change to the external electronic device (e.g., the electronic device 102 or the electronic device 104) by using the communication module 190, in response to detecting of a change in the state related to the movement of the electronic device 101.

In various embodiments, the movement-related information may indicate the default data (or default parameter) 410 of a Personal Safety Message (PSM) as described in the description with reference to FIG. 4. In various embodiments, the information related to the state change may indicate the optional data (or optional parameter) 420 of the PSM as described in the description with reference to FIG. 4.

Figure 6:
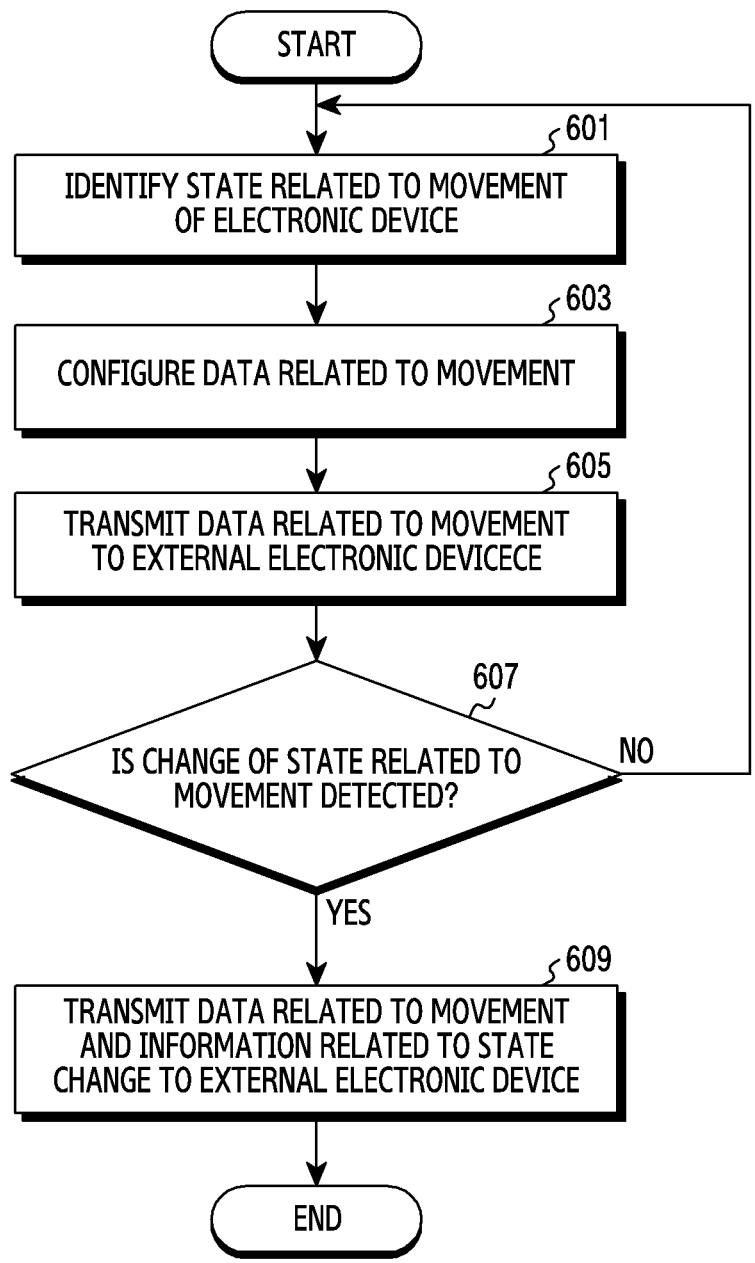
FIG. 6 is a flowchart illustrating a method of operating an electronic device according to various embodiments.

FIG. 6 is a flowchart illustrating a method of operating an electronic device according to various embodiments.

Referring to FIG. 6, in operation 601, the processor 120 of the electronic device 101 may identify a state related to a movement of the electronic device 101. According to an embodiment, the processor 120 may use at least the sensor module 176 or the wireless communication module 192 to acquire the movement-related information, and may use the acquired information to determine the state related to the movement of the electronic device 101.

In operation 603, the processor 120 may configure the movement-related information. According to an embodiment, if there is no information for the optional data 420, the processor 120 may configure only the default data 410 for the PSM on the basis of the acquired movement-related information.

In operation 605, the processor 120 may transmit the movement-related information to a nearby external electronic device (e.g., the electronic device 102 or the electronic device 104).

In operation 607, the processor 120 may determine whether a change in the state related to the movement of the electronic device 101 is detected, based on identifying of the state related to the movement. For example, the processor 120 may monitor whether at least one state related to the optional data 420 is changed If the change in the state related to the movement is not detected in operation 607 (NO in operation 607), returning to operation 601, the processor 120 may perform operations subsequent to operation 601.

If the change in the state related to the movement is detected in operation 607 (YES in operation 607), in operation 609, the processor 120 may transmit the movement-related information (e.g., the default data 410 of the PSM) and the information related to the state change (e.g., the optional data 420 of the PSM) to an external electronic device (e.g., the electronic device 102 or the electronic device 104) by using a communication module.

Figure 7:
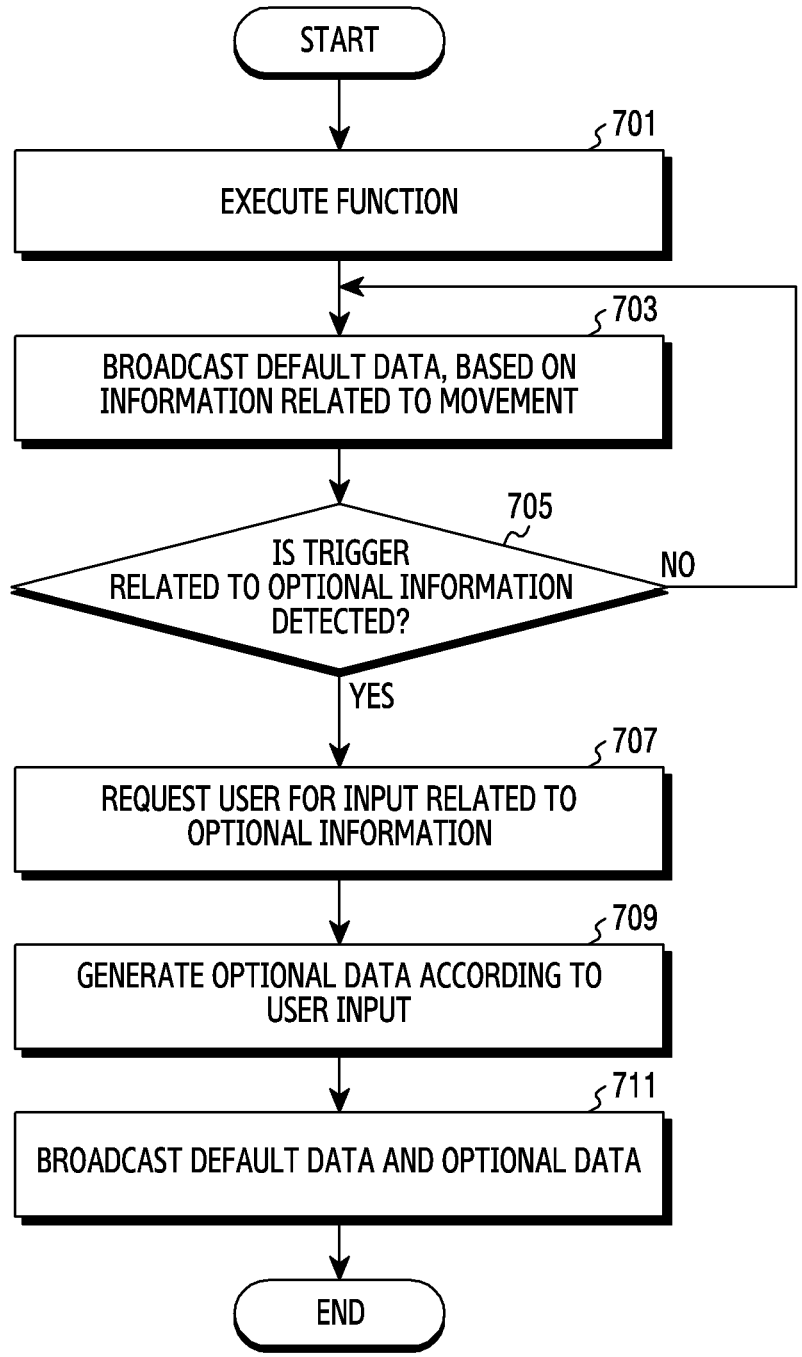
FIG. 7 is a flowchart illustrating a method of operating an electronic device according to various embodiments.

FIG. 7 is a flowchart illustrating a method of operating an electronic device according to various embodiments.

In various embodiments, FIG. 7 may show an example of detecting a change in a state of the electronic device 101 to acquire additional information (e.g., information related to optional data) to be transmitted, when the electronic device 101 transmits a WAVE signal.

Referring to FIG. 7, in operation 701, the processor 120 of the electronic device 101 may execute a function (or application (e.g., V2X safety application)). According to an embodiment, the processor 120 may execute the function, at least based on a function execution request of the user or a pre-configured condition (e.g., a situation of detecting a user's movement, or the like).

In operation 703, the processor 120 may broadcast default data, based on movement-related information. According to an embodiment, the processor 120 may use at least the sensor module 176 or the wireless communication module 192 to acquire the movement-related information. The processor 120 may use the acquired information to generate the default data, and may broadcast the generated default data to nearby external electronic devices (e.g., unspecified multiple electronic devices) by using a communication module.

In operation 705, the processor 120 may determine whether a trigger related to optional information (e.g., state change information for optional data) is detected. According to an embodiment, the processor 120 may determine whether at least one state change for optional data of a PSM is detected, at least based on the movement-related information.

If the trigger related to the optional information is not detected in operation 705 (NO in operation 705), returning to operation 703, the processor 120 may perform operations subsequent to operation 703.

If the trigger related to the optional information is detected in operation 705 (YES in operation 705), in operation 707, the processor 120 may request a user for an input related to the optional information. According to an embodiment, the processor 120 may perform an operation for acquiring the optional information through an interaction between the electronic device 101 and the user. According to an embodiment, the processor 120 may request for the input for the optional information, based on a voice assistant. The voice assistant may include a configuration that can be used to generate optional information in accordance with a user's command by recognizing a user's voice. For example, the voice assistant may include a series of configurations for generating data, based on voice recognition as at least one configuration corresponding to the explanation described with reference to FIG. 2. According to other embodiments, the processor 120 may request for an input related to the optional information, based on a display (e.g., the display device 160). For example, the processor 120 may provide (or output) a query for the user's input to the user through the display.

In operation 709, the processor 120 may generate related optional data according to the user input. According to an embodiment, the processor 120 may acquire the user input on the basis of an interaction between the electronic device 101 and the user, and may identify at least one piece of optional information on the basis of the acquired input. The processor 120 may generate optional data, based on the at least one piece of optional information. According to an embodiment, the processor 120 may also generate default data, based on the movement-related information, and if there is no change in the default data, may generate optional data in addition to the existing data. According to an embodiment, the optional data may include at least one field corresponding to at least one piece of optional information, and may configure optional data by including each piece of optional information in at least one field.

In operation 711, the processor 120 may broadcast default data and optional data. According to an embodiment, the processor 120 may broadcast a PSM (e.g., a WAVE signal of a data packet structure as shown in FIG. 4) including the default data and the optional data to a nearby external electronic device (e.g., the electronic device 102 or the electronic device 104) by using the communication module.

According to various embodiments, as shown in FIG. 7, the electronic device 101 may generate and transmit movement-related data (e.g., default data) based on sensor information of the electronic device 101 when a basic WAVE signal (e.g., PSM) is broadcast. Thereafter, the electronic device 101 may request the user for additional information (e.g., optional information) in accordance with a moving situation of the electronic device 101, and may update and transmit the additional information in default information according to a user input.

Figure 8:
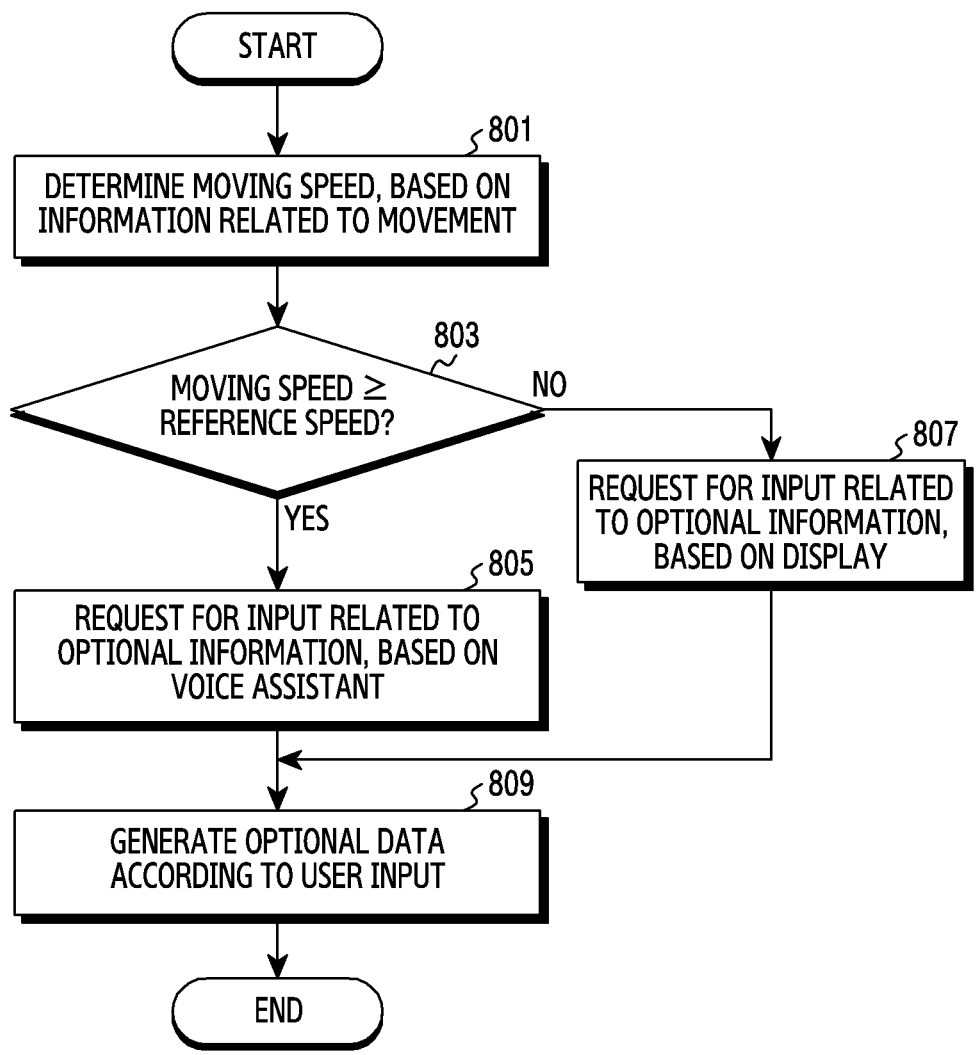
FIG. 8 is a flowchart illustrating a method of operating an electronic device according to various embodiments.

FIG. 8 is a flowchart illustrating a method of operating an electronic device according to various embodiments.

In various embodiments, FIG. 8 may show a detailed example of detecting a change in a state of the electronic device 101 to acquire additional information (e.g., information related to optional data) to be transmitted, when the electronic device 101 transmits a WAVE signal.

Referring to FIG. 8, in operation 801, the processor 120 of the electronic device 101 may determine a moving speed of the electronic device 101 (or a user of the electronic device 101), based on movement-related information. According to an embodiment, the processor 120 may use at least the sensor module 176 and/or the wireless communication module 192 to determine a speed, at least based on measuring a variation of the movement-related information (e.g., a location, a distance, a direction, etc.).

In operation 803, the processor 120 may compare the determined moving speed (e.g., a current measured moving speed of the electronic device 101) and a pre-configured reference speed, based on the determination result. According to an embodiment, the processor 120 may determine whether the moving speed is greater than or equal to the reference speed.

If it is determined that the moving speed is greater than or equal to the reference speed in operation 803 (YES in operation 803), in operation 805, the processor 120 may request for an input related to optional information, based on a voice assistant. According to an embodiment, the processor 120 may use a voice agent to output an audio signal for requesting the user to perform an update suitable for a current situation change.

If it is determined that the moving speed does not exceed the reference speed in operation 803 (NO in operation 803), for example, if it is determined that the moving speed is less than the reference speed, in operation 807, the processor 120 may request for an input related to optional information, based on a display (e.g., the display device 160). According to an embodiment, the processor 120 may output a screen (e.g., a UI or a GUI, for example, a pop-up window) for requesting the user to perform the update suitable for the current situation change through the display.

In operation 809, the processor 120 may generate optional data according to a user input. According to an embodiment, the processor 120 may use the voice assistant or the display to determine at least one piece of optional information, based on the user input acquired through an interaction between the electronic device 101 and the user. The processor 120 may generate the optional data, based on the at least one piece of optional information. According to an embodiment, the optional data may include at least one field corresponding to the at least one piece of optional information, and may configure optional data by including each piece of optional information in at least one field.

According to various embodiments, as shown in FIG. 8, the electronic device 101 may basically transmit the default data 410 when transmitting a WAVE signal (e.g., a PSM), and may determine whether the WAVE signal currently being transmitted is suitable when a moving speed of the electronic device 101 is greater than or equal to a specific speed. For example, an average moving speed of a pedestrian may not generally exceed 5 km/h. Therefore, if it is determined that the moving speed of the pedestrian exceeds 10 km/h, the electronic device 10 may determine that a user is on board another transportation means (e.g., a motorcycle, a vehicle, etc.) other than walking which is a basic transportation means, or uses a tool such as a bicycle of the like. In this case, the electronic device 101 may operate a voice secretary function (e.g., an AI-based voice recognition function) based on a voice assistant to acquire accurate information for a user's situation. According to an embodiment, the electronic device 101 may identify a state change related to an increase in a moving speed of the electronic device 101, and may generate and output a query for a parameter related to a state change. Thereafter, upon receiving a user's voice input for the query, the electronic device 101 may analyze the received voice to identify information of the changed state. For example, the electronic device 101 may determine whether the changed state information is a response that can be updated. Upon determining that it is the response that can be updated, the electronic device 101 may transmit a WAVE signal by changing a corresponding parameter (e.g., update, add, or delete information of a corresponding field of optional data) when there is a parameter that can be changed related to a user response.

As such, according to various embodiments, the electronic device 101 may monitor moving information of the electronic device 101, and may determine whether it is a situation in which additional information has to be transmitted in addition to default information. Upon determining that it is a situation in which the additional information has to be transmitted, the electronic device 101 may determine a process for collecting the additional information, based on the moving speed of the electronic device 101. According to an embodiment, if the moving speed of the electronic device 101 is greater than or equal to a reference speed, the electronic device 101 may determine that it is difficult for the user to interact with the electronic device 101, and may collect information on a current situation by using the voice assistant. According to an embodiment, if the moving speed of the electronic device 101 is within (e.g., less than) the reference speed, the electronic device 101 may induce a user's selection through a popup window or the like on the electronic device 101. Thereafter, in the presence of information accurately received from the user, the electronic device 101 may transmit newly received information (e.g., additional information or optional information) related to a state change of the electronic device 101, in addition to the default information.

Meanwhile, according to various embodiments, the voice assistant may be activated in various manners in addition to the operation based on the moving speed as shown in FIG. 8. According to an embodiment, when shaking of the electronic device 101 is significant on the basis of sensor information (e.g., shaking (or vibration) information), the electronic device 101 may execute a voice agent through the HMI module 350, and may generate and output a query for a current change by using the voice agent. According to an embodiment, when the shaking of the electronic device 101 is weak or interrupted, the electronic device 101 may output a screen so that a related user input can be received on a display through the HMI module 350. According to an embodiment, upon determining that a noise around the electronic device 101 is less than a reference value on the basis of an audio acquired around the electronic device 101 through a microphone (e.g., the input device 150), the electronic device 101 may execute the voice agent through the HMI module 350, and may generate and output a query for a current change by using the voice agent. According to an embodiment, upon determining that the noise around the electronic device 101 is greater than the reference value on the basis of the audio acquired around the electronic device 101 through the microphone (e.g., the input device 150), the electronic device 101 may output a screen so that a related user input can be received on a display through the HMI module 350.

Figure 9:
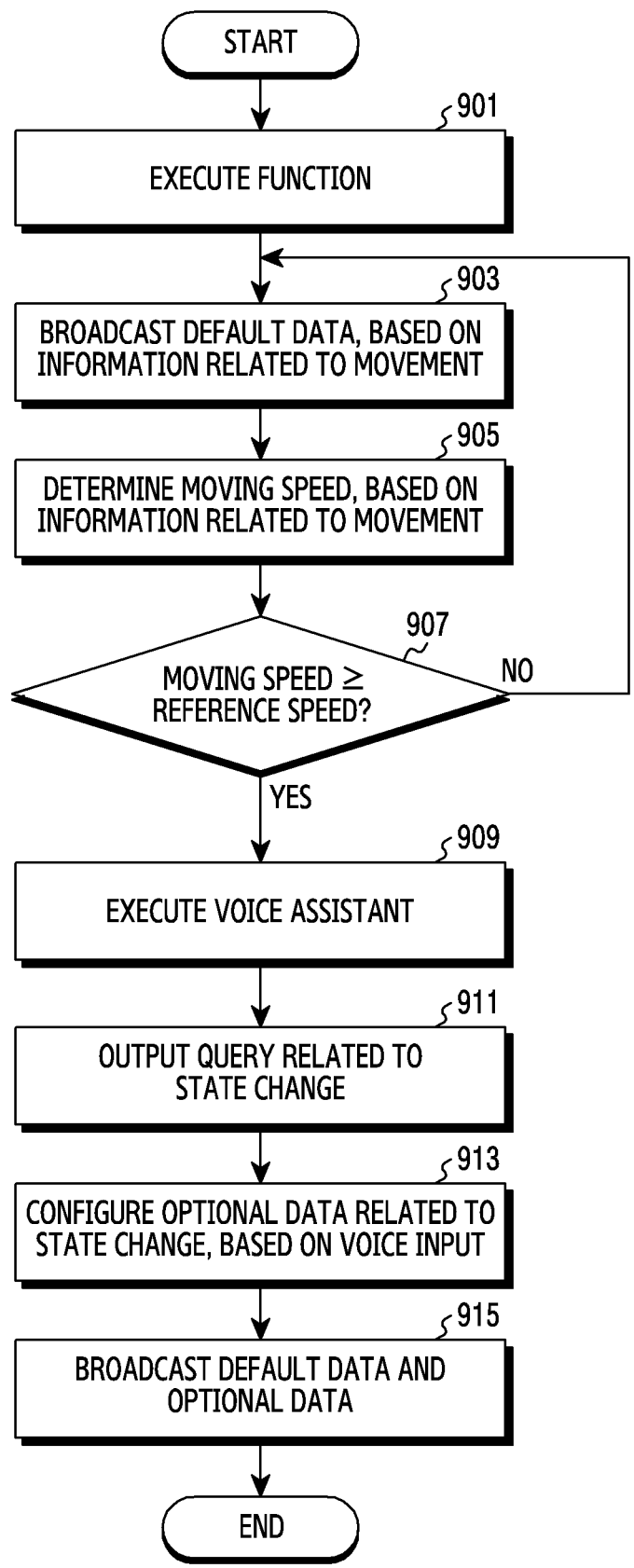
FIG. 9 is a flowchart illustrating a method of operating an electronic device according to various embodiments.

FIG. 9 is a flowchart illustrating a method of operating an electronic device according to various embodiments.

Referring to FIG. 9, in operation 901, the processor 120 of the electronic device 101 may execute a function (or application (e.g., V2X safety application)). According to an embodiment, the processor 120 may execute the function, at least based on a function execution request of the user or a pre-configured condition (e.g., a situation of detecting a user's movement, or the like).

In operation 903, the processor 120 may broadcast default data, based on movement-related information of the electronic device 101. According to an embodiment, the processor 120 may generate default data, based on the movement-related information acquired by using at least the sensor module 176 or the wireless communication module 192, and may broadcast the default data to nearby external electronic devices (e.g., unspecified multiple electronic devices) by using a communication module.

In operation 905, the processor 120 may determine a moving speed, based on movement-related information. According to an embodiment, the processor 120 may use at least the sensor module 176 and/or the wireless communication module 192 to determine a speed, at least based on measuring a variation of the movement-related information (e.g., a location, a distance, a direction, etc.).

In operation 907, the processor 120 may compare the determined moving speed (e.g., a current measured moving speed of the electronic device 101) and a pre-configured reference speed, based on the determination result. According to an embodiment, the processor 120 may determine whether the moving speed is greater than or equal to the reference speed.

If the moving speed does not exceed the reference speed in operation 907 (YES in operation 907), returning to operation 903, the processor 120 may perform operations subsequent to operation 903.

If the moving speed is greater than or equal to the reference speed in operation 907 (NO in operation 907), in operation 909, the processor 120 may execute a voice assistant.

In operation 911, the processor 120 may output a query for a state of the electronic device 101, based on the voice assistant. According to an embodiment, the processor 120 may generate a query (e.g., a related voice signal) for obtaining a parameter related to a state change depending on an increase in a moving speed and may output the query through a speaker.

In operation 913, the processor 120 may configure optional data related to the state change, based on a user's voice input. According to an embodiment, the processor 120 may acquire a user input (e.g., a voice input) through a microphone, based on an interaction between the electronic device 101 and the user, and may identify at least one piece of optional information, based on the acquired input. The processor 120 may generate optional data, based on the at least one piece of optional information.

In operation 915, the processor 120 may broadcast default data and optional data. According to an embodiment, the processor 120 may broadcast a PSM (e.g., a WAVE signal) including the default data and the optional data to a nearby external electronic device (e.g., the electronic device 102 or the electronic device 104) by using the communication module.

Figure 10:
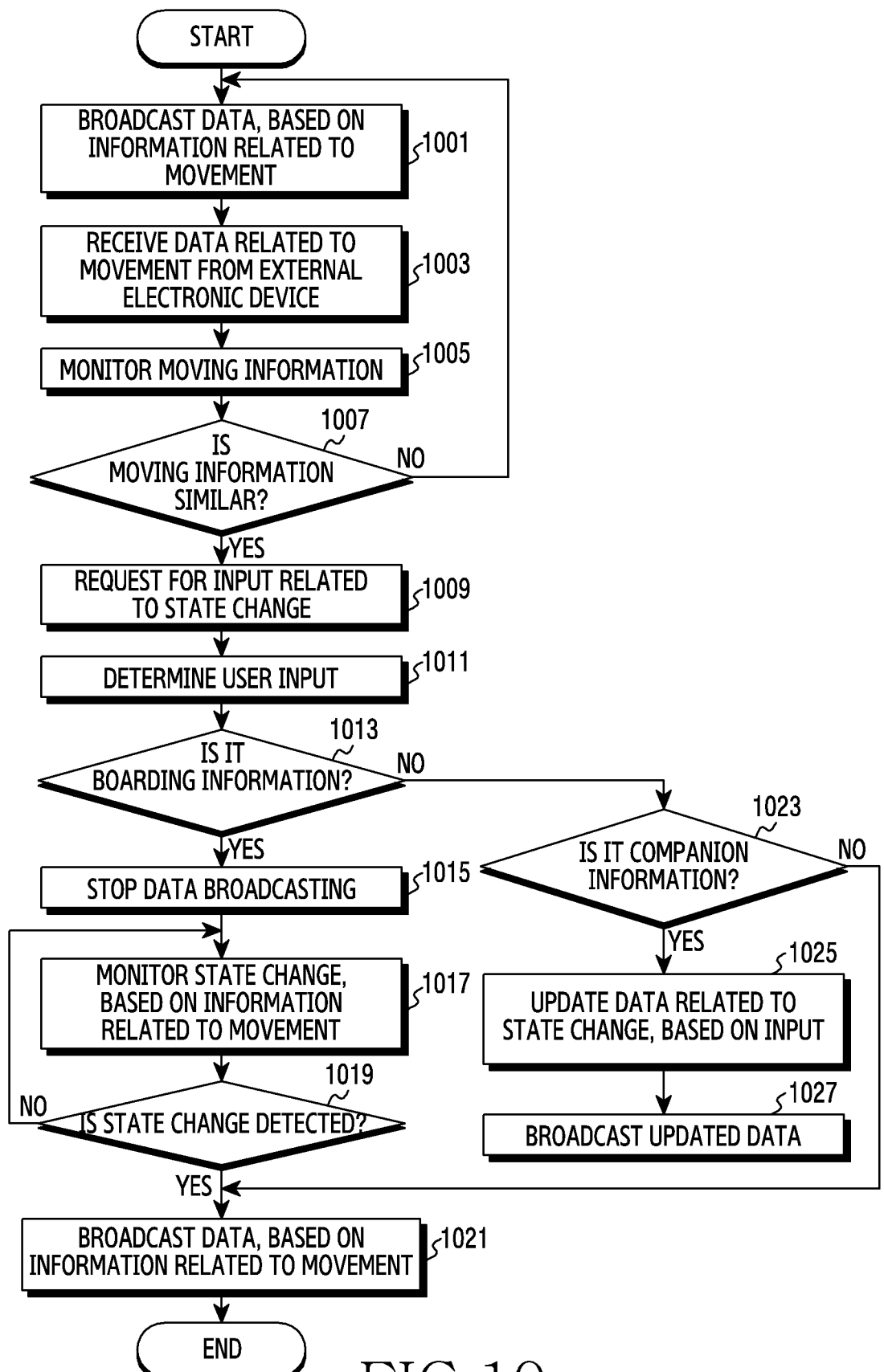
FIG. 10 is a flowchart illustrating a method of operating an electronic device according to various embodiments.

FIG. 10 is a flowchart illustrating a method of operating an electronic device according to various embodiments.

Referring to FIG. 10, in operation 1001, the processor 120 of the electronic device 101 may broadcast data, based on movement-related information. According to an embodiment, the processor 120 may acquire information related to a movement of the electronic device 101, based on execution (e.g., background execution) of an application (e.g., a V2X safety application) related to PSM broadcasting. The processor 120 may be in a state of broadcasting a PSM by using the default data 410 alone or both of the default data 410 and the optional data 420, based on the movement-related information.

In operation 1003, the processor 120 may receive the movement-related information from at least one nearby external electronic device (e.g., the electronic device 102 or the electronic device 104). According to an embodiment, the processor 120 may receive a PSM (e.g., default data, or default data and optional data) which is broadcast by the external electronic device (e.g., the electronic device 102 or the electronic device 104) through a communication module.

In operation 1005, the processor 120 may monitor moving information. According to an embodiment, the processor 120 may compare information (hereinafter, first WAVE data or first moving information) related to a movement of the electronic device 101 and information (hereinafter, second WAVE data or second moving information) related to a movement of an external electronic device and acquired based on data received from the external electronic device (e.g., the electronic device 102 or the electronic device 104).

In operation 1007, the processor 120 may determine whether moving information is similar between the electronic device 101 and the external electronic device, based on a comparison result of the first WAVE data and the second WAVE data.

According to an embodiment, the processor 120 may determine a moving speed, moving direction, moving time, current location, or the like related to moving of the electronic device 101 and the external electronic device, based on the first WAVE data and the second WAVE data. For example, the processor 120 may determine whether the electronic device 101 and the external electronic device are being moved together for at least a specific time in the same or similar direction or speed. In various embodiments, an operation in which the electronic device 101 acquires data of the external electronic device will be described below with reference to FIG. 11.

According to an embodiment, the processor 120 may monitor moving information based on the first WAVE data transmitted by the electronic device 101 and moving information based on the second WAVE data received from the nearby external electronic device. If a monitoring result shows that the electronic device 101 and the external electronic device are matched by at least a specific distance by using the moving information based on the first WAVE data and the moving information based on the second WAVE data, the processor 120 may request the user to input information on a changed state through the HMI module 350.

If it is determined in operation 1007 that the moving information of the first WAVE data is not similar to the moving information of the second WAVE data, returning to operation 1001, the processor 120 may perform operations subsequent to operation 1001.

If it is determined in operation 1007 that the moving information of the first WAVE data is similar (or identical) to the moving information of the second WAVE data, in operation 1009, the processor 120 may request the user for an input related to a state change. According to an embodiment, if it is determined that the moving information is similar, the processor 120 may inquire the user about a state change for vehicle boarding and may request for an input thereof. According to an embodiment, if it is determined that the moving information is similar, the processor 120 may inquire the user about identifying of a companion and may request for an input thereof. According to an embodiment, if it is determined that the moving information is similar, the processor 120 may inquire the user about identifying whether the user is on board a vehicle or whether there is a companion, and may request for an input thereof. In various embodiments, the processor 120 may request the user for a related input by using the voice assistant or the display.

In operation 1011, the processor 120 may determine the user input, in response to receiving of the input by the user.

According to various embodiments, the processor 120 may determine whether the user input corresponds to boarding information in operation 1013, and may determine whether the user input corresponds to, for example, companion information which requires an update of optional information in operation 1023. According to an embodiment, when the user inputs information on vehicle boarding (e.g., a user voice input related to "vehicle boarding" or a user selection (e.g., touch) input based on a UI (or GUI)), the processor 120 may determine that the input corresponds to boarding information. According to another embodiment, when the user inputs information on a companion (e.g., an input for identifying at least one companion and an input for updating companion information for a corresponding companion), the processor 120 may determine that an update based on the companion information is required. In various embodiments, operation 1013 and operation 1023 may be performed in parallel, or any one of operation 1013 and operation 1023 may be selectively performed.

If the boarding information is determined based on the user input in operation 1013 (YES in operation 1013), in operation 1015, the processor 120 may stop data broadcasting. For example, in response to the inquiring the user about the state change for the vehicle boarding, the processor 120 may stop a data transmission operation according to the vehicle boarding until getting off the vehicle, upon acquiring the boarding information for the vehicle boarding.

In operation 1017, the processor 120 may monitor whether the state of the electronic device 101 is changed, based on the information related to the movement of the electronic device 101. According to an embodiment, the processor 120 may operate to acquire the movement-related information from the inside (e.g., the electronic device 101) and/or the outside (e.g., an external electronic device (e.g., the electronic device 102 or the electronic device 104)) while stopping the data transmission operation.

In operation 1019, the processor 120 may determine whether the state change for the electronic device 101 is detected, based on a monitoring result. According to an embodiment, the processor 120 may determine whether the state of the electronic device 101 is changed (e.g., determine the getting off the vehicle due to a decrease in a moving speed or the like), based on the monitoring result.

If the state change of the processor 120 is not detected in operation 1019 (NO in operation 1019), returning to operation 1017, the processor 120 may perform operations subsequent to operation 1017.

If the state change is detected in operation 1019 (YES in operation 1019), in operation 1021, the processor 120 may resume a data broadcasting operation, based on the movement-related information (e.g., information related to a movement after the state change or information related to the state change).

If the companion information is determined based on the user input in operation 1023 (YES in operation 1023), in operation 1025, the processor 120 may update the information related to the state change, based on the input. According to an embodiment, the processor 120 may configure optional data, based on a user response (e.g., a voice input (e.g., Update, please) or a touch input based on a popup window) for a query for the companion information (e.g., Do you want to update companion information?). For example, the processor 120 may identify at least one external electronic device corresponding to the user input from data received from the external electronic device, and may configure the identified external electronic device as a moving group. The processor 120 may update optional data by adding information, related to the external electronic device configured as the moving group, as optional information. According to an embodiment, the processor 120 may further perform an operation of notifying that the moving group is configured to the external electronic devices configured as the moving group.

In operation 1027, the processor 120 may broadcast the updated data. According to an embodiment, the external electronic device configured as the moving group in the electronic device 101 may stop data broadcasting until the moving group with the electronic device 101 is released.

According to various embodiments, if the information related to the state change is not acquired similarly to operation 1013 and operation 1023 as a result of determining the user input (e.g., if there is no optional information), proceeding to operation 1021, the processor 120 may continuously broadcast data, based on the information related to the movement of the electronic device 101.

Figure 11:
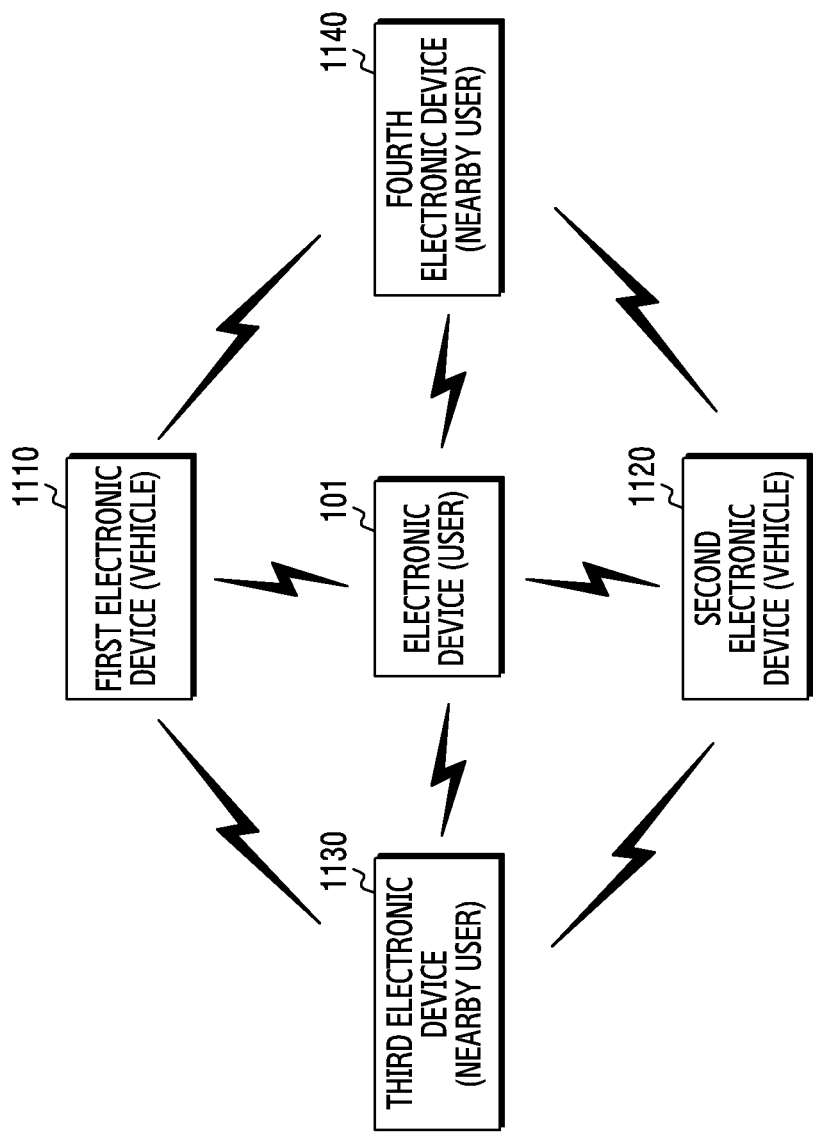
FIG. 11 is a drawing for explaining an example in which an electronic device acquires data from an external electronic device according to various embodiments.

FIG. 11 is a drawing for explaining an example in which an electronic device acquires data from an external electronic device according to various embodiments.

In various embodiments, FIG. 11 may show a relation of broadcasting and receiving data between electronic devices included in a WAVE system.

Referring to FIG. 11, for example, the electronic device 101 is a user's device (e.g., a smart phone, a tablet PC, a wearable device, etc.). A first electronic device 1110 and a second electronic device 1120 are devices (e.g., a vehicle control device) provided inside a vehicle. A third electronic device 1130 and a fourth electronic device 1140 are devices (e.g., a smart phone, a tablet PC, a wearable device, etc.) of another user (or a pedestrian, a companion, etc.) located around the electronic device 101 (or a user of the electronic device 101).

According to an embodiment, the first electronic device 1110 and the second electronic device 1120 may include a device provided inside a vehicle being driven around the electronic device 101 or a device of at least one user in the vehicle. The first electronic device 1110 and the second electronic device 1120 may be devices located within a specific distance from the electronic device 101.

According to an embodiment, the third electronic device 1130 and the fourth electronic device 1140 may include devices of other users located around the electronic device 101.

According to various embodiments, the electronic devices 101, 1110, 1120, 1130, and 1140 may acquire movement-related information, based on sensor information and/or location information or the like, and may receive data (e.g., a PSM) from at least one nearby external electronic device.

According to various embodiments, the electronic devices 101, 1110, 1120, 1130, and 1140 may include, for example, configurations for supporting WAVE communication (e.g., V2X). According to an embodiment, the electronic devices 101, 1110, 1120, 1130, and 1140 may include a communication circuit (e.g., a WiFi module, a WAVE communication module (e.g., a modem), etc.), a monitoring unit, an HMI module, or the like. According to an embodiment, the electronic devices 101, 1110, 1120, 1130, and 1140 support 5 GHz in case of WiFi and use up to 5.8 GHz. Therefore, it may be applicable by supporting communication using the 802.11P standard inside a communication circuit (e.g., modem) chip while directly using the existing circuit component and antenna.

According to various embodiments, each of the electronic devices 101, 1110, 1120, 1130, and 1140 may broadcast data (e.g., default data, or default data and optional data) to the nearby external electronic device, based on movement-related information. According to an embodiment, the data may include identification information (e.g., ID information) for each electronic device. The identification information is information for identifying a corresponding electronic device, and may include information indicating a device type (e.g., whether it is a vehicle or a roadside device or the like). Therefore, the electronic device which receives data of the external electronic device may identify whether a device which has transmitted the data is a device of a vehicle or a device of a user.

Figure 12:
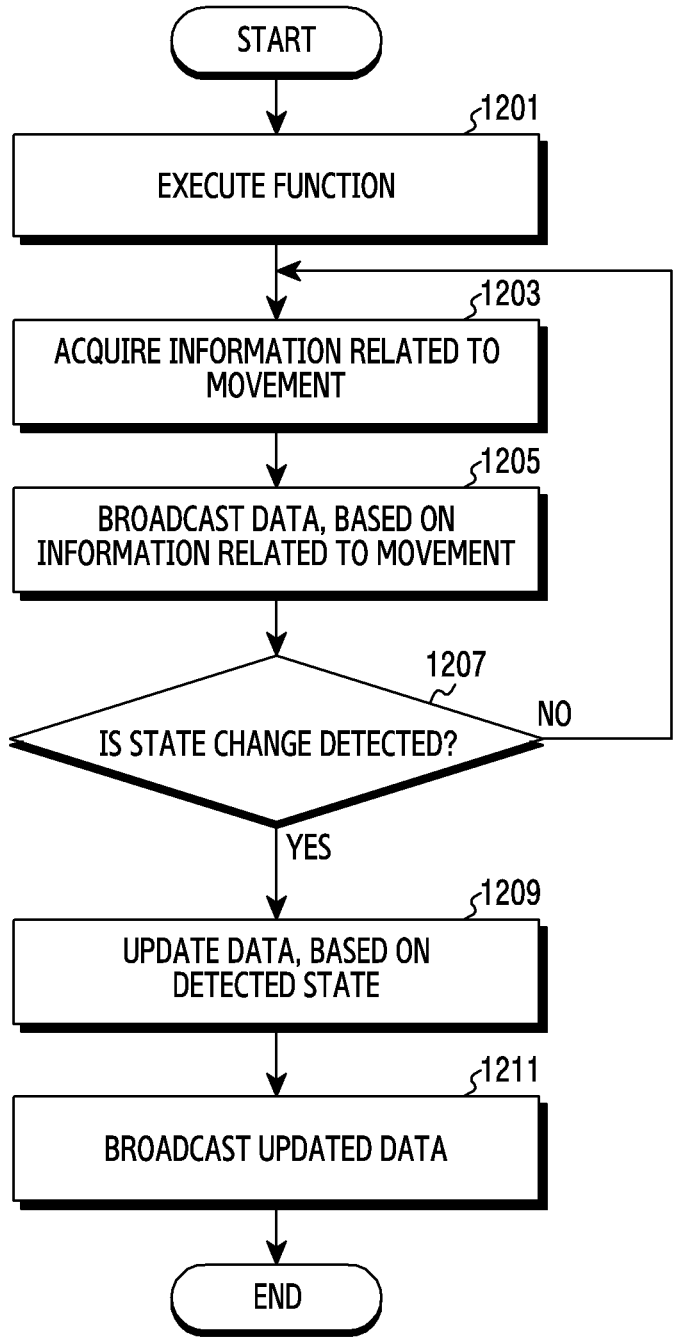
FIG. 12 is a flowchart illustrating a method of operating an electronic device according to various embodiments.

FIG. 12 is a flowchart illustrating a method of operating an electronic device according to various embodiments.

In various embodiments, FIG. 12 may show another example in which the electronic device 101 transmits a WAVE signal (e.g., data).

Referring to FIG. 12, in operation 1201, the processor 120 of the electronic device 101 may execute a function (or an application) related to a safety service. In various embodiments, the execution of the function may operate in background.

In operation 1203, the processor 120 may acquire information related to a movement of the electronic device 101, in response to the execution of the function.

In operation 1205, the processor 120 may broadcast data to an external electronic device, based on the movement-related information. According to an embodiment, on the basis of the movement-related information, the data may be data constructed only with default data or may be data constructed of the default data and optional data together. For example, the data may include only essential data, or may further include additional information for ensuring safety based on a user situation.

In operation 1207, the processor 120 may determine whether a change in a state related to the movement of the electronic device 101 is determined. According to an embodiment, the processor 120 may determine a state change (hereinafter, a first determination), based on deciding additional information depending on the user situation, in a state of transmitting data including default information. According to an embodiment, the processor 120 may determine the state change (hereinafter, a second determination), based on deciding the absence of the additional information depending on the user situation, in a state of transmitting data including the default information and additional information. According to an embodiment, the processor 120 may determine the state change (hereinafter, a third determination), based on deciding a change (or update) of the additional information depending on the user situation, in the state of transmitting the data including the default information and additional information.

If the state change is not detected in operation 1207 (NO in operation 1207), returning to operation 1203, the processor 120 may perform operations subsequent to operation 1203.

If the state change is detected in operation 1207 (YES in operation 1207), in operation 1209, the processor 120 may update data, based on the detected state. According to an embodiment, the processor 120 may update data so that additional information is further included in default information, based on the first determination. According to an embodiment, the processor 120 may update data so that only default information is included in the data except for additional information, based on the second determination. According to an embodiment, the processor 120 may update data by changing (e.g., adding, deleting, modifying, or the like) at least part of additional information corresponding to the state change in the additional information of data, based on the third determination.

In operation 1211, the processor 120 may broadcast the updated data to the external electronic device.

As described above, a method of operating the electronic device 101 according to various embodiments may include identifying a state related to a movement of the electronic device by using at least one sensor, and if the state related to the movement is changed, transmitting information related to the movement and information related to the state change to an external electronic device by using the communication module. The identifying of the state related to the movement may include transmitting the information related to the movement to the external electronic device by using the communication module.

According to various embodiments, the method may further include generating the information related to the state change. The generating of the information related to the state change may include acquiring a voice of a user of the electronic device through a voice input module, and generating the information related to the state change, at least based on the voice.

According to various embodiments, the method may further include displaying a user interface for an input of the information related to the state change through a display operatively coupled with the electronic device, and generating the information related to the state change, at least based on an input corresponding to the user interface.

According to various embodiments, the method may further include requesting for an input of the information related to the state change, if the state related to the movement is changed, and acquiring the information related to the state change from the user, based on an interaction with the user.

According to various embodiments, the method may further include identify a level of the state, based on a configured condition if the state related to the movement is changed, acquire the information related to the state change, at least based on the user's voice, if the state corresponds to a first condition, and acquire the information related to the state change, at least based on an input corresponding to the user interface, if the state corresponds to a second condition.

According to various embodiments, the identifying of the state related to the movement may include identifying the state related to the movement, at least based on a change in a moving speed, a vibration level of the electronic device, information related to a movement of the external electronic device, or whether the user is on board a vehicle.

According to various embodiments, the method may further include determining a moving speed of the electronic device, in response to detecting of a trigger related to the state change, and acquiring the user's voice for the input of the information related to the state change, through the voice input module if the moving speed is greater than or equal to a reference speed.

According to various embodiments, the method may further include receiving, through the communication module, information transmitted by the external electronic device and related to a movement of the external electronic device, the information related to the movement, and information related to a state change of the external electronic device.

According to various embodiments, the method may further include identifying first moving information related to the movement of the electronic device and second moving information related to a movement of the external electronic device, and determining whether to stop transmission of the information related to the movement of the electronic device, based on the first moving information and the second moving information.

According to various embodiments, the method may further include identify first moving information related to the movement of the electronic device and second moving information related to a movement of the external electronic device, and generating information related to accompanying of the electronic device and the external electronic device, at least as part of the information related to the state change based on the first moving information and second moving information.

Various embodiments of the disclosure disclosed in the specification and the drawing are merely a specific example presented for clarity and are not intended to limit the scope of the disclosure. Therefore, in addition to the embodiments disclosed herein, various changes in forms and details made without departing from the technical concept of the disclosure will be construed as being included in the scope of the disclosure.

The invention claimed is:

1. An electronic device comprising:
a communication module;
at least one sensor; and
a processor,
wherein the processor is configured to:
identify a state related to a movement of the electronic device by using the at least one sensor, transmit information related to the movement to an external electronic device by using the communication module; and
detect a state change corresponding to a change of the state related to the movement by using the at least one sensor,
in response to detecting the state change, obtain information related to the state change by receiving a user input regarding the state change, and
transmit, to the external electronic device, the information related to the movement and the information related to the state change by using the communication module.

2. The electronic device of claim 1, further comprising a voice input module,
wherein the processor is configured to:
receive the user input through the voice input module; and
obtain the information related to the state change, at least based on user input,
wherein the user input includes a voice of a user of the electronic device.

3. The electronic device of claim 1, wherein the processor is configured to:
display a user interface for the user input regarding the state change through a display operatively coupled with the electronic device; and
obtain the information related to the state change, at least based on an input corresponding to the user interface.

4. The electronic device of claim 1, wherein the processor is configured to:
request for the user input of the information related to the state change, if the state related to the movement is changed; and
acquire the information related to the state change from the user, based on an interaction with the user.

5. The electronic device of claim 1, wherein the processor is configured to:
identify a level of the state, based on a configured condition, if the state related to the movement is changed;
acquire the information related to the state change, at least based on the user's voice, if the state corresponds to a first condition; and
acquire the information related to the state change, at least based on an input corresponding to the user interface, if the state corresponds to a second condition.

6. The electronic device of claim 1, wherein the processor is configured to identify the state related to the movement, at least based on a change in a moving speed, a vibration level of the electronic device, information related to a movement of the external electronic device, or whether the user is on board a vehicle.

7. The electronic device of claim 2, wherein the processor is configured to:
determine a moving speed of the electronic device, in response to detecting of a trigger related to the state change; and
acquire the user's voice for the input of the information related to the state change, through the voice input module, if the moving speed is greater than or equal to a reference speed.

8. The electronic device of claim 1, wherein the processor is configured to receive, through the communication module, information transmitted by the external electronic device and related to a movement of the external electronic device, the information related to the movement, and information related to a state change of the external electronic device.

9. The electronic device of claim 1, wherein the processor is configured to:
identify first moving information related to the movement of the electronic device and second moving information related to a movement of the external electronic device; and
determine whether to stop transmission of the information related to the movement of the electronic device, based on the first moving information and the second moving information.

10. The electronic device of claim 1, wherein the processor is configured to:
identify first moving information related to the movement of the electronic device and second moving information related to a movement of the external electronic device; and
generate information related to accompanying of the electronic device and the external electronic device, at least as part of the information related to the state change based on the first moving information and second moving information.

11. A method of operating an electronic device, the method comprising:
identifying a state related to a movement of the electronic device by using at least one sensor; and
transmit information related to the movement to an external electronic device by using a communication module;
detecting a state change corresponding to a change of the state related to the movement by using the at least one sensor, and
in response to detecting the state change, obtaining information related to the state change by receiving a user input regarding the state change,
transmitting information related to the movement and the information related to the state change to an external electronic device by using the communication module.

12. The method of claim 11, further comprising
receiving the user input through a voice input module; and
obtaining the information related to the state change, at least based on the user input,
wherein the user input includes a voice of a user of the electronic device.

13. The method of claim 11, further comprising:
displaying a user interface for the user input regarding the state change through a display operatively coupled with the electronic device; and
obtaining the information related to the state change, at least based on an input corresponding to the user interface.

14. The method of claim 11, further comprising:
requesting for the user input of the information related to the state change, if the state related to the movement is changed; and
acquiring the information related to the state change from the user, based on an interaction with the user.

15. The method of claim 11, wherein the identifying of the state related to the movement comprises identifying the state related to the movement, at least based on a change in a moving speed, a vibration level of the electronic device, information related to a movement of the external electronic device, or whether the user is on board a vehicle.

16. The method of claim 14, further comprising:
identifying a level of the state, based on a configured condition if the state related to the movement is changed;
acquiring the information related to the state change, at least based on the user's voice, if the state corresponds to a first condition; and
acquiring the information related to the state change, at least based on an input corresponding to the user interface, if the state corresponds to a second condition.

17. The method of claim 12, further comprising:
determining a moving speed of the electronic device, in response to detecting of a trigger related to the state change; and
acquiring the user's voice for the input of the information related to the state change, through the voice input module if the moving speed is greater than or equal to a reference speed.

18. The method of claim 11, further comprising:
receiving, through the communication module, information transmitted by the external electronic device and related to a movement of the external electronic device, the information related to the movement, and information related to a state change of the external electronic device.

19. The method of claim 11, further comprising:
identifying first moving information related to the movement of the electronic device and second moving information related to a movement of the external electronic device; and determining whether to stop transmission of the information related to the movement of the electronic device, based on the first moving information and the second moving information.

20. The method of claim 11, further comprising:

identifying first moving information related to the movement of the electronic device and second moving information related to a movement of the external electronic device; and generating information related to accompanying of the electronic device and the external electronic device, at least as part of the information related to the state change based on the first moving information and second moving information.

* * * * *